(12) United States Patent
Terashita

(10) Patent No.: US 9,801,213 B2
(45) Date of Patent: Oct. 24, 2017

(54) COMMUNICATION APPARATUS

(71) Applicant: Brother Kogyo Kabushiki Kaisha, Nagoya-shi, Aichi-ken (JP)

(72) Inventor: Kunihito Terashita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 98 days.

(21) Appl. No.: 14/740,647

(22) Filed: Jun. 16, 2015

(65) Prior Publication Data

US 2015/0365985 A1 Dec. 17, 2015

(30) Foreign Application Priority Data

Jun. 16, 2014 (JP) .................. 2014-123239

(51) Int. Cl.
*H04W 12/00* (2009.01)
*H04W 76/02* (2009.01)
*H04W 12/06* (2009.01)

(52) U.S. Cl.
CPC ............ *H04W 76/02* (2013.01); *H04W 12/00* (2013.01); *H04W 12/06* (2013.01); *H04W 76/027* (2013.01)

(58) Field of Classification Search
CPC ........................ H04W 76/02; H04W 76/027
See application file for complete search history.

(56) References Cited

U.S. PATENT DOCUMENTS

| 2011/0268027 | A1 | 11/2011 | Nogawa |
| 2013/0260683 | A1 | 10/2013 | Suzuki et al. |
| 2014/0287695 | A1 | 9/2014 | Nogawa |
| 2015/0312945 | A1* | 10/2015 | Park ............... H04W 12/04 370/338 |
| 2016/0007333 | A1* | 1/2016 | Takahashi ........ H04W 76/023 370/329 |

FOREIGN PATENT DOCUMENTS

JP 2011-234205 A 11/2011

OTHER PUBLICATIONS

Wi-Fi Alliance Technical Committee P2P Task Group, "Wi-Fi Peer-to-Peer (P2P)Technical Specification", Version 1.1, pp. 1-159.

* cited by examiner

*Primary Examiner* — Hassan Phillips
*Assistant Examiner* — Ayanah George
(74) *Attorney, Agent, or Firm* — Banner & Witcoff, Ltd.

(57) ABSTRACT

A communication apparatus may receive a connection request signal from a particular external apparatus; determine, based on the connection request signal, whether a wireless connection with the particular external apparatus is to be established; send a response signal to the particular external apparatus in a case of determining that the wireless connection is to be established; and establish the wireless connection in a case where the response signal is sent to the particular external apparatus. The determining may include: determining that the wireless connection is to be established in a case where both a first condition and a second condition are satisfied; and determining that the wireless connection is not to be established in a case where at least one of the first condition and the second condition is not satisfied.

8 Claims, 8 Drawing Sheets

FIG. 2 (First Embodiment)

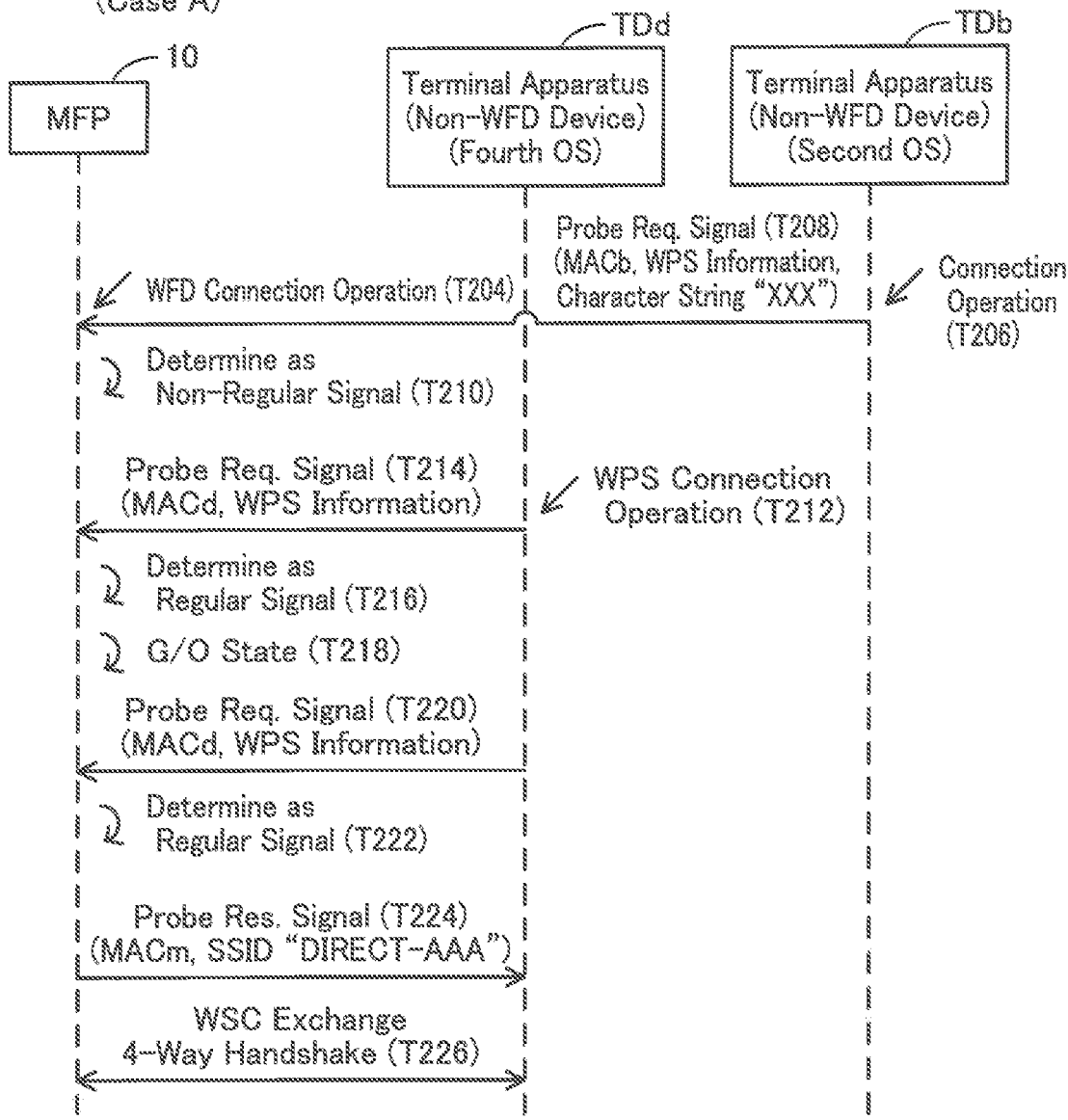

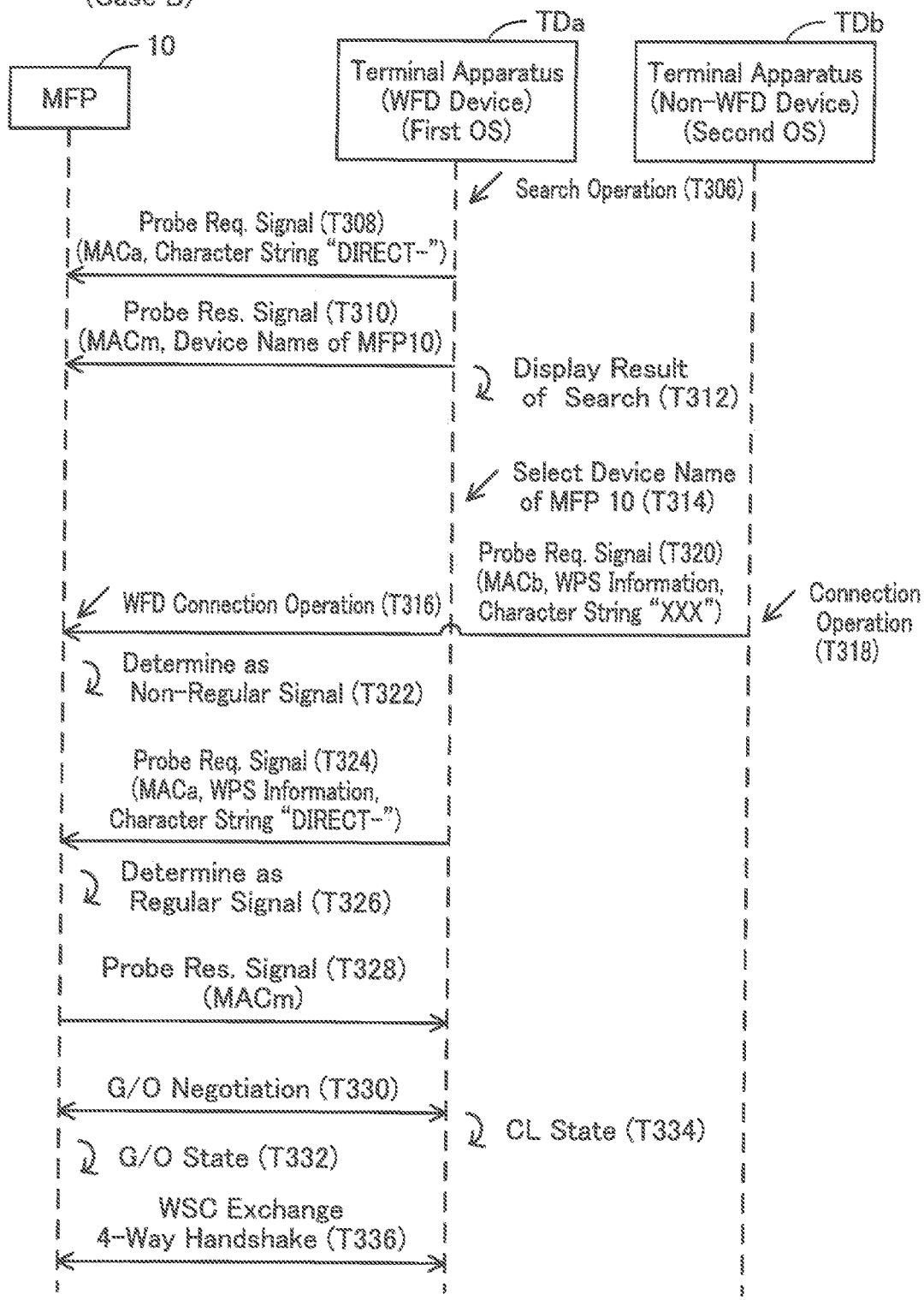

COMMUNICATION APPARATUS

CROSS-REFERENCE TO RELATED APPLICATIONS

This application claims priority to Japanese Patent Application No. 2014-123239, filed on Jun. 16, 2014, the contents of which are hereby incorporated by reference into the present application.

TECHNICAL FIELD

The present specification discloses a communication apparatus for establishing a wireless connection with an external apparatus.

DESCRIPTION OF RELATED ART

A technique by which a multi-function apparatus sends a Probe Request signal, acquires a Probe Response signal including a SSID (abbreviation of Service Set Identifier) from each AP (abbreviation of Access Point), and displays a list of the SSIDs is known. When a Probe Request signal including an SSID selected by a user includes information indicating that a Wi-Fi Protected Setup (WPS) scheme is supported, the multi-function apparatus performs a wireless setting in accordance with the WPS scheme, that is, a wireless setting in accordance with an automatic wireless setting mode.

SUMMARY

In a situation where a wireless connection is to be established with a target external apparatus in accordance with a so-called automatic wireless connection scheme, such as the WPS scheme, hypothetically, upon receiving a connection request signal from an external apparatus that differs from the target external apparatus, a communication apparatus may establish a wireless connection with the aforementioned different external apparatus. Consequently, there is a possibility that the communication apparatus will not be able to establish a wireless connection with the target external apparatus. The present specification discloses a technique for the communication apparatus to appropriately establish the wireless connection with the target external apparatus.

One aspect disclosed in the present specification may be a communication apparatus comprising: a processor; and a memory storing computer-readable instructions therein, the computer-readable instructions, when executed by the processor, causing the communication apparatus to perform: receiving a connection request signal from a particular external apparatus after a wireless connection operation for establishing a wireless connection with an external apparatus has been performed on the communication apparatus; determining, based on the connection request signal, whether a wireless connection with the particular external apparatus is to be established, in a case where the connection request signal is received from the particular external apparatus; sending a response signal for establishing the wireless connection with the particular external apparatus to the particular external apparatus in a case of determining that the wireless connection with the particular external apparatus is to be established, wherein the response signal may be not sent to the particular external apparatus in a case of determining that the wireless connection with the particular external apparatus is not to be established; and establishing the wireless connection with the particular external apparatus according to a predetermined wireless connection scheme in a case where the response signal is sent to the particular external apparatus, the predetermined wireless connection scheme being for establishing the wireless connection between the communication apparatus and the particular external apparatus without an input of an identifier for authentication by a user to any of the communication apparatus and the particular external apparatus, wherein the determining may include: determining that the wireless connection with the particular external apparatus is to be established in a case where both a first condition and a second condition are satisfied, the first condition being a condition that the connection request signal is a request according to the predetermined wireless connection scheme, the second condition being a condition that a state of a particular area in the connection request signal is a predetermined state, the particular area being an area in which a relation character string may be described, and the relation character string being related to an identifier to be used in the wireless connection which is to be established between the communication apparatus and the particular external apparatus; and determining that the wireless connection with the particular external apparatus is not to be established in a case where at least one of the first condition and the second condition is not satisfied.

Moreover, a control method, a computer program, and a computer-readable recording medium that stores the computer program, all for realizing the communication apparatus, are also novel and useful. Further, a communication system comprising the communication apparatus and the particular external apparatus is also novel and useful.

BRIEF DESCRIPTION OF DRAWINGS

FIG. 7 shows a sequence diagram of a Case A in the third embodiment; and

FIG. 8 shows a sequence diagram of a Case B in the third embodiment.

EMBODIMENTS

First Embodiment

Figure 1:
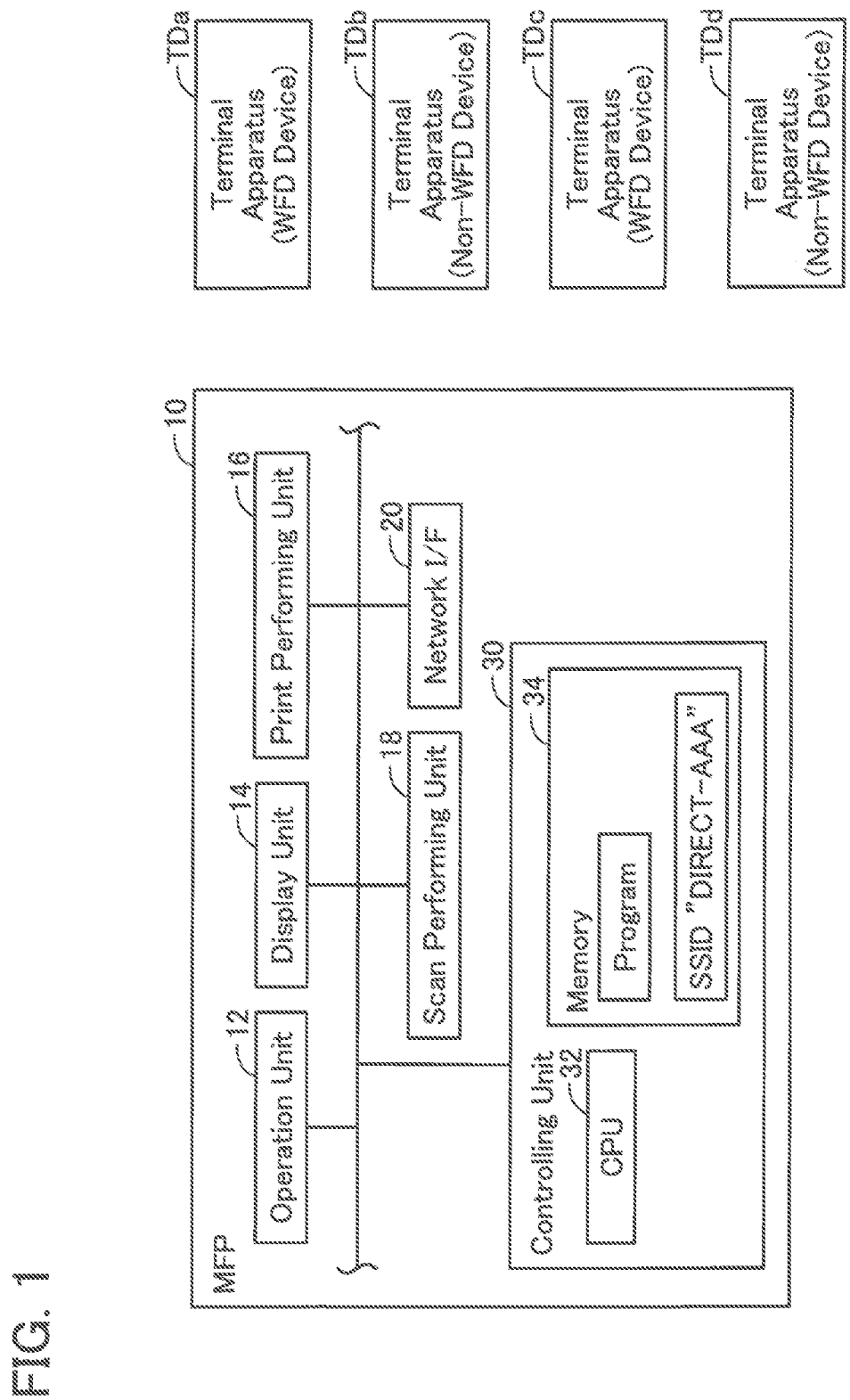
FIG. 1 shows a configuration of a multi-function apparatus.

Configuration of Multi-Function Apparatus 10:
FIG. 1

A multi-function apparatus 10 (called "multi-function peripheral (MFP)" hereinbelow) is a peripheral apparatus (i.e., a peripheral apparatus such as a terminal apparatus TDa) that is capable of performing multiple functions including a print function and a scan function. The MFP 10 comprises an operation unit 12, a display unit 14, a print performing unit 16, a scan performing unit 18, a network interface 20, and a controlling unit 30. Interface will be denoted as "I/F" hereinbelow.

The operation unit 12 is configured using a plurality of keys. A user can input various instructions to the MFP 10 by manipulating the operation unit 12. The display unit 14 is a display for displaying various types of information. The print performing unit 16 is a printing mechanism, such as an ink jet system, laser system or the like. The scan performing unit 18 is a scanning mechanism such as a CCD or CIS.

The network I/F 20 is an interface for performing a Wi-Fi scheme wireless communication. The Wi-Fi scheme, for example, is a wireless communication scheme according to IEEE (abbreviation of The Institute of Electrical and Electronics Engineers, Inc) standard 802.11, or standards conforming thereto (e.g.: 802.11a, 11b, 11g, 11n, and so forth).

Stated more specifically, the network I/F 20 supports the WPS scheme devised by the Wi-Fi Alliance. The WPS scheme is called an automatic wireless connection scheme or easy wireless connection scheme, and is a scheme for automatically establishing a wireless connection between a pair of devices even when information for establishing a wireless connection (e.g., a password, an authentication method, an encryption method) has not been input by the user into either of the pair of the devices. In particular, the network I/F 20 supports a PBC (abbreviation of push-button configuration) scheme of the WPS scheme. The PBC scheme is for establishing a wireless connection between a pair of devices in a case where a wireless connection operation (e.g., a button-pushing operation) is performed by the user in each of the pair of the devices even though the aforementioned information for establishing a wireless connection is not input by the user into either of the pair of the devices.

The network I/F 20 also supports a Wi-Fi Direct (WFD) scheme devised by the Wi-Fi Alliance. Therefore, the controlling unit 30 can perform a Wi-Fi communication via the network I/F 20 using a WFD-scheme wireless network (hereinafter called "WFDNW"). The WFD scheme is for establishing a wireless connection between a pair of devices using the WPS scheme. In particular, the WFD scheme is for forming a WFDNW in which a wireless connection is established between a device that operates in a Group Owner state (hereinafter called "G/O state"), and a device that operates in a Client state (hereinafter called "CL state"). Furthermore, the WFD scheme is the scheme by which a wireless communication called a G/O negotiation is performed when a wireless connection is to be established between a pair of devices that are in a Device state that is neither a G/O state nor a CL state. The G/O negotiation is a wireless communication for determining the operating states of a pair of devices (i.e., either a G/O state or a CL state). Furthermore, hereinbelow, a device that operates in the G/O state and a device that operates in the CL state are called a "G/O device" and a "CL device", respectively. The WFD scheme is described in detail in "Wi-Fi Peer-to-Peer (P2P) Technical Specification Version 1.1" prepared by the Wi-Fi Alliance. The WFD scheme is also disclosed in detail in US Patent Application Publication No. 2013/0260683 of which contents are incorporated herein by reference.

The controlling unit 30 is provided with a CPU 32 and a memory 34. The CPU 32 is a processor that executes various processes in accordance with a program stored in the memory 34.

(Terminal Apparatuses TDa to TDd)

Each of terminal apparatuses TDa to TDd is a portable terminal apparatus such as a mobile telephone, a smartphone, a notebook PC, or a tablet PC. However, in a modification, the terminal apparatuses TDa to TDd may be stationary terminal apparatuses, such as a desktop PC. Each of the terminal apparatuses TDa to TDd is provided with a different communication program. Specifically, the terminal apparatuses TDa, TDb, TDc, and TDd respectively comprise a first communication program, a second communication program, a third communication program, and a fourth communication program. The first and the third communication programs support the WFD scheme, and as such, the terminal apparatuses TDa and TDc are WFD devices that support the WFD scheme. The second and the fourth communication programs do not support the WFD scheme, and as such, the terminal apparatuses TDb and TDd are non-WFD devices that do not support the WFD scheme. Furthermore, the difference of communication programs, for example, may be difference of operation system (OS) programs, or difference of application programs.

Figure 2:
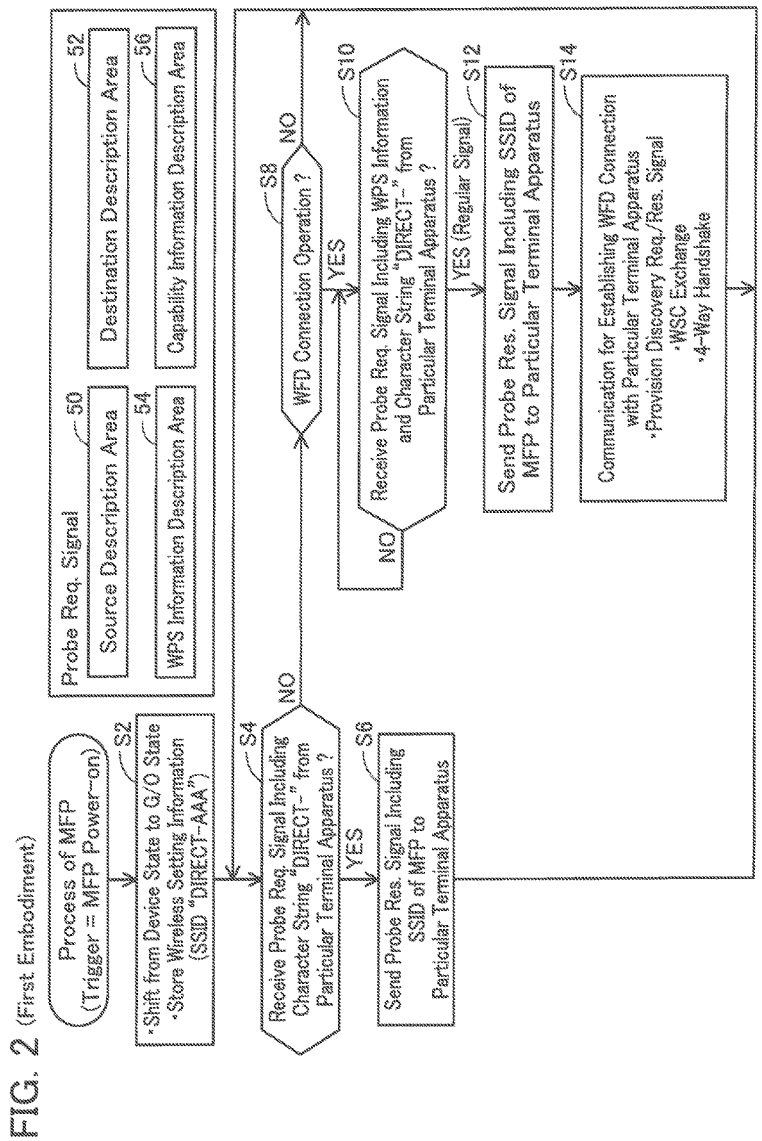
FIG. 2 shows a flowchart of processing in the multi-function apparatus of a first embodiment.

(Processing Executed by MFP 10; FIG. 2)

Next, the contents of processing executed by the CPU 32 of the MFP 10 will be explained by referring to FIG. 2. The processing of FIG. 2 is triggered by the power to the MFP 10 being turned ON by the MFP 10 user. At the time point at which the power to the MFP 10 is turned ON, the operating state of the MFP 10 is the Device state of the WFD scheme.

In S2, the CPU 32 shifts the operating state of the MFP 10 from the Device state to the G/O state. That is, the CPU 32 spontaneously shifts the operating state of the MFP 10 to the G/O state without performing a G/O negotiation. In accordance with this, a WFDNW to which only an MFP 10 that is the G/O device belongs is formed.

In S2, the CPU 32 also causes the memory 34 to store wireless setting information to be used in the WFDNW. The wireless setting information includes an SSID, an authentication scheme, an encryption scheme, and a password. The CPU 32 creates a character string "DIRECT-AAA" as the SSID, which is the identifier for identifying the WFDNW. Because the SSID is created by the MFP 10, which is the G/O device, the SSID can be considered to be the identifier for identifying the G/O device (i.e, the MFP 10). FIG. 1 shows how the SSID "DIRECT-AAA" is stored in the memory 34. The first half of the SSID "DIRECT-AAA", i.e., the character string "DIRECT-" is not only for a WFDNW in which the MFP 10 operates as the G/O device, but rather is normally also used in a WFDNW in which a device that differs from the MFP 10 operates as the G/O device. That is, the SSID of the WFDNW normally includes the character string "DIRECT-". By contrast, the latter half of the SSID "DIRECT-AAA", i.e., the character string "AAA", is arbitrarily determined by the MFP 10. In the present embodiment, the character string "AAA" is determined beforehand by a program of the MFP 10. That is, the character string more toward the rear of the SSID than "DIRECT-" normally differs for each WFDNW. The CPU 32 causes the memory 34 to store a predetermined authentication scheme and encryption scheme. The CPU 32 also creates a password by randomly creating a character string, for example, and causes the memory 34 to store this password. This password is used in data encryption when a data communication that uses the WFDNW (for example, a print data or scan data communication) is to be performed.

In S4, the CPU 32 monitors for a Probe Request signal to be received from a particular terminal apparatus, which is a terminal apparatus (e.g., TDa to TDd) that exists peripherally to the MFP 10. The CPU 32 proceeds to S6 upon receiving the Probe Request signal (YES in S4). The term Request will be denoted as "Req." hereinbelow.

The Probe Req. signal comprises a source description area 50, a destination description area 52, a WPS information description area 54, and a capability information description area 56. The source description area 50 is where a MAC address of the particular terminal apparatus, which is the source of the Probe Request signal, is described. The destination description area 52 is where the MAC address of the MFP 10, which is the destination of the Probe Request signal, may be described. Since the MAC address of the MFP 10 has already been acquired in a case where the particular terminal apparatus has previously communicated with the MFP 10, this MAC address is described in the destination description area 52. However, in a case where the particular terminal apparatus has never communicated with the MFP 10, the MAC address of the MFP 10 has not been acquired, and so the MAC address is not described in the destination description area 52. That is, in this case, information that does not indicate a particular destination is described in the destination description area 52. This state will be called a null state hereinbelow.

The WPS information description area 54 is where WPS information indicating that the particular terminal apparatus supports the WPS scheme may be described. In a case where the particular terminal apparatus supports the WPS scheme, WPS information is described in the WPS information description area 54. In particular, in a case where the particular terminal apparatus supports the PBC scheme of the WPS scheme, WPS information indicating that the PBC scheme is supported is described in the WPS information description area 54. In a case where the particular terminal apparatus does not support the WPS scheme, WPS information is not described in the WPS information description area 54. That is, in this case, the WPS information description area 54 is left blank. Furthermore, it depends on the communication program that is installed in the particular terminal apparatus, but when the destination description area 52 is in the null state, WPS information may not be described in the WPS information description area 54 even though the particular terminal apparatus supports the WPS scheme. For example, in a case where the first communication program is installed in the particular terminal apparatus, when the destination description area 52 is in the null state, the WPS information description area 54 is left blank even though the particular terminal apparatus supports the WPS scheme. Furthermore, for example, in a case where the second communication program is installed in the particular terminal apparatus, the WPS information is described in the WPS information description area 54 when the particular terminal apparatus supports the WPS scheme even when the destination description area 52 is in the null state.

The capability information description area 56 is an area where capability information indicating that the particular terminal apparatus supports the WFD scheme may be described. In a case where the particular terminal apparatus supports the WFD scheme, the character string "DIRECT-" is described in the capability information description area 56. In a case where the particular terminal apparatus does not support the WFD scheme, the character string "DIRECT-" is not described in the capability information description area 56. Furthermore, in a case where the particular terminal apparatus does not support the WFD scheme, the capability information description area 56 is normally left blank. However, for example, in a case where the aforementioned second communication program is installed in the particular terminal apparatus, a predetermined character string (e.g., refer to the character string "XXX" of T20 in FIG. 3 described below) is described in the capability information description area 56 even though the particular terminal apparatus does not support the WFD scheme. As described hereinabove, the character string "DIRECT-" is a character string included in the SSID "DIRECT-AAA" of the WFDNW that was created in S2. Then, as will be explained in detail below, when a wireless connection is established between the MFP 10 and the particular terminal apparatus (refer to S14 described below), the SSID "DIRECT-AAA" is used. Therefore, the character string "DIRECT-" can be considered to be the character string associated with the SSID used in a wireless connection to be established between the MFP 10 and the particular terminal apparatus. That is, the capability information description area 56 can be considered to be the area where an SSID-associated character string may be described.

In S6, the CPU 32 sends the particular terminal apparatus a Probe Response signal including the MAC address of the MFP 10 and the SSID "DIRECT-AAA" created in S2. When S6 ends, the CPU 32 returns to S4. That is, when a Probe Req. signal is received from the particular terminal apparatus while the process by the CPU 32 is looping in S4 and S6, the CPU 32 sends the particular terminal apparatus a Probe Response signal regardless of a type of the particular terminal apparatus, whatever the type may be. The term Response will be denoted as "Res." hereinbelow.

In S8, the CPU 32 monitors for a WFD connection operation to be performed by the user on the operation unit 12 of the MFP. The WFD connection operation is for establishing a wireless connection according to the WFD scheme (i.e., a WFD connection) between the MFP 10 and another device, and corresponds to a push-button operation of the PBC scheme. In particular, in the present embodiment, the WFD connection operation is for allowing another device, which is a CL device, to participate in the WFDNW formed by the MFP 10, which is the G/O device. In a case where the WFD connection operation is performed (YES in S8), the CPU 32 proceeds to S10.

In S10, the CPU 32 monitors for a Probe Req. signal in which WPS information and the character string "DIRECT-" are described in the WPS information description area 54 and the capability information description area 56, respectively, to be received from the particular terminal apparatus. The CPU 32, upon receiving the Probe Req. signal from the particular terminal apparatus (YES in S10), sends a Probe Res. signal to the particular terminal apparatus in S12. The Probe Res. signal sent at this time is the same Probe Res. signal sent in S6. Alternatively, in a case where a Probe Req. signal in which WPS information is not described in the WPS information description area 54 is received, or in a case where a Probe Req. signal in which the character string "DIRECT-" is not described in the capability information description area 56 is received, the CPU 32 determines NO in S10, and does not proceed to S12 (i.e., does not send any Probe Res. signal). Hereinafter, with respect to a Probe Req. signal received while the CPU 32 is executing the monitor process of S10, a Probe Req. signal determined YES in S10 will be called a "regular signal", and a Probe Req. signal determined NO in S10 will be called a "non-regular signal", respectively. That is, in S10, the CPU 32, based on the Probe Req. signal, determines whether the Probe Req. signal is a regular signal or a non-regular signal. That is, in a case where the Probe Req. signal is received from the particular terminal apparatus while S10 is being performed (i.e., after the WFD connection operation has been performed in S8), whether or not the CPU 32 sends the Probe Res. signal to the particular terminal apparatus depends on the information described in the Probe Req. signal (i.e., depends on the type of the particular terminal apparatus).

In S14, the CPU 32 performs various signal communications (i.e., Provision Discovery Req./Res. signals, WSC Exchange, 4-Way Handshake) with the particular terminal apparatus for establishing a WFD connection, and establishes the WFD connection with the particular terminal apparatus. Specifically, in the process of communicating the aforementioned various signals, the CPU 32 sends the particular terminal apparatus the wireless setting information created in S2 (i.e., the SSID "DIRECT-AAA", the authentication scheme, the encryption scheme, and the password). The WSC Exchange and 4-Way Handshake communications are performed according to the WPS scheme. Hereby, the particular terminal apparatus can establish a WFD connection with the MFP 10 using the same wireless setting information as the wireless setting information used by the MFP 10, and consequently can participate as the CL device in the WFDNW in which the MFP 10 operates as the G/O device. When S14 ends, the CPU 32 returns to S4.

Figure 3:
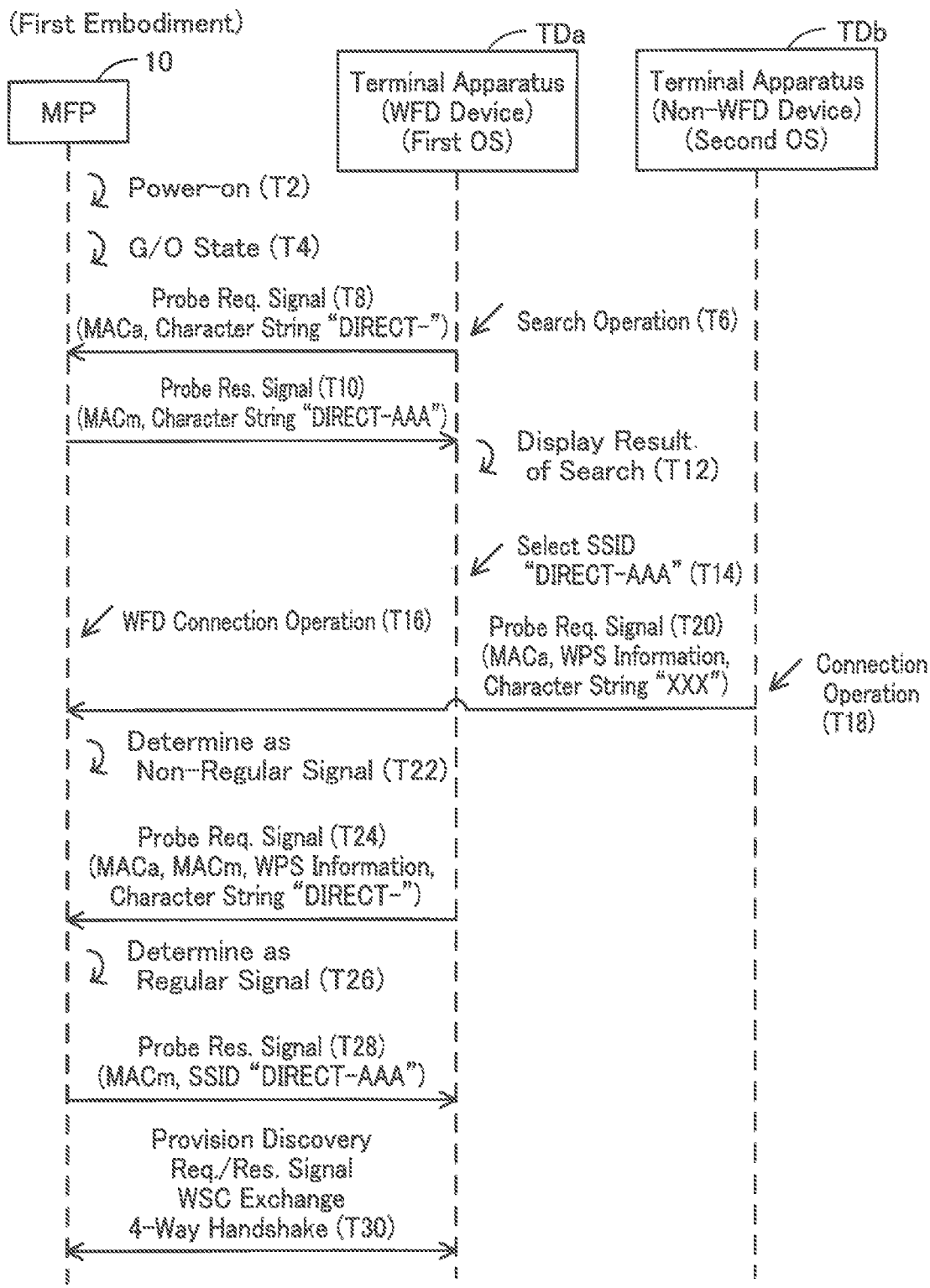
FIG. 3 shows a sequence diagram of the first embodiment.

(Specific Case; FIG. 3)

Next, the contents of a specific case realized according to the flowchart of FIG. 2 will be explained by referring to FIG. 3. The MFP 10 user wants to establish a WFD connection between the MFP 10 and the terminal apparatus TDa.

In T2, the user turns ON the power to the MFP 10 (the trigger in FIG. 2). In accordance with this, in T4, the MFP 10 shifts from the Device state to the G/O state (S2). Consequently, a WFDNW is formed to which only the MFP 10, which is the G/O device, belongs.

In T6, the user performs a search operation on the terminal apparatus TDa to search for a G/O device and a 'Device' device that exist peripherally to the terminal apparatus TDa. In accordance with this, in T8, the terminal apparatus TDa sends a Probe Req. signal. The respective areas 50 to 54 of in the Probe Req. signal of T8 are in the following states. That is, the MAC address of the terminal apparatus TDa (called "MACa" hereinbelow) is described in the source description area 50. Because the terminal apparatus TDa has not acquired the MAC address of the MFP 10 (called "MACm" hereinbelow), the destination description area 52 is in the null state. Since the aforementioned first communication program is installed on the terminal apparatus TDa, the WPS information description area 54 is left blank in a case where the destination description area 52 is in the null state. Furthermore, since the terminal apparatus TDa is a WFD device, the character string "DIRECT-" is described in the capability information description area 56.

The MFP 10, upon receiving the Probe Req. signal from the terminal apparatus TDa (YES in S4), sends the terminal apparatus TDa a Probe Res. signal including the MACm and the SSID "DIRECT-AAA" in T10 (S6).

The terminal apparatus TDa, upon receiving the Probe Res. signal from the MFP 10, causes results of search including the SSID "DIRECT-AAA" to be displayed on a display unit (not shown) of the terminal apparatus TDa in T12. For example, in a case where either a G/O device or a "Device" device that differs from the MFP 10 exists peripherally to the terminal apparatus TDa at this time, results of search including either the SSID or the device name of these apparatuses are displayed. In T14, the user selects the SSID "DIRECT-AAA" of the MFP 10 from among the results of search. The operation for selecting the SSID of the MFP 10 here is for establishing a WFD connection between the MFP 10 and the terminal apparatus TDa, and corresponds to the push-button operation of the PBC scheme. In T16, the user performs a WFD connection operation (i.e., a push-button operation of a PBC scheme) on the MFP 10 (YES in S8).

In T18, the user of the terminal apparatus TDb performs a connection operation on the terminal apparatus TDb. The terminal apparatus TDb is not the target terminal apparatus (i.e., TDa) with which the MFP 10 is to establish the WFD connection. For example, the user of the terminal apparatus TDb performs the connection operation of T18 when the user wants to establish a wireless connection between the terminal apparatus TDb and either a G/O device or an AP that differs from the MFP 10.

In T20, the terminal apparatus TDb sends a Probe Req. signal. The respective areas 50 to 54 of the T20 Probe Req. signal are in the following states. That is, the MAC address MACb of the terminal apparatus TDb is described in the source description area 50. Because the terminal apparatus TDb has not acquired the MAC address MACm of the MFP 10, the destination description area 52 is in the null state. Since the aforementioned second communication program is installed on the terminal apparatus TDb, the WPS information is described in the WPS information description area 54 even when the destination description area 52 is in the null state. Since the terminal apparatus TDb is a non-WFD device, the character string "DIRECT-" is not described in the capability information description area 56. Since the aforementioned second communication program is installed on the terminal apparatus TDb, a predetermined character string "XXX" is described in the capability information description area 56.

Upon receiving the Probe Req. signal from the terminal apparatus TDb, the MFP 10 determines in T22 that the Probe Req. signal is a non-regular signal (i.e., that a wireless connection is not to be established with the terminal apparatus TDb) in T22 (NO in S10). This is because although the WPS information is described in the WPS information description area 54 of the Probe Req. signal, the character string "XXX" is described in the capability information description area 56, and the character string "DIRECT-" is not described in the capability information description area 56.

In T24, the terminal apparatus TDa sends a Probe Req. signal to the MFP 10. The respective areas 50 to 56 in the Probe Req. signal of T24 are in the following states. That is, the MAC address of the terminal apparatus TDa (i.e., MACa) is described in the source description area 50. Because the Probe Req. signal of T10 has been received, the terminal apparatus TDa has acquired the MACm. Therefore, the MACm is described in the destination description area 52. Since the terminal apparatus TDa supports the WPS scheme, the WPS information is described in the WPS information description area 54. Since the terminal apparatus TDa supports the WFD scheme, the character string "DIRECT-" is described in the capability information description area 56.

Upon receiving the Probe Req. signal from the terminal apparatus TDa, the MFP 10 determines in T26 that the Probe Req. signal is a regular signal (i.e., a WFD connection is to be established with the terminal apparatus TDa) (YES in S10 of FIG. 2). This is because the WPS information is described in the WPS information description area 54 of the Probe Req. signal, and the character string "DIRECT-" is described in the capability information description area 56. Next, in T28, the MFP 10 sends a Probe Res. signal including the MACm and the SSID "DIRECT-AAA" to the terminal apparatus TDa (S12), and in T30, performs communications for Provision Discovery Req./Res. signal, WSC Exchange, and 4-Way Handshake with the terminal apparatus TDa (S14). In accordance with this, a WFD connection is established between the MFP 10 and the terminal apparatus TDa.

That is, the MFP 10 can allow the terminal apparatus TDa to participate as the CL device in the WFDNW in which the MFP 10 operates as the G/O device.

As described hereinabove, the following communications may be performed in a state where the MFP 10 and the terminal apparatus TDa belong to the same WFDNW. For example, the MFP 10 can receive an image file from the terminal apparatus TDa using the WFDNW (i.e., using the WFD connection), and to perform printing of the image represented by the image file. Furthermore, for example, the MFP 10 can create scan data by performing a scan of an original document, and can send the scan data to the terminal apparatus TDa using the WFDNW (i.e., using the WFD connection).

Effects of First Embodiment

As shown in FIG. 3, after the WFD connection operation (T16) to the MFP 10 has been performed, the MFP 10 receives the Probe Req. signal from the terminal apparatus TDb, which differs from the target terminal apparatus TDa (T20). Hypothetically, in a case where the MFP 10 sends the Probe Res. signal to the terminal apparatus TDb and once the wireless connection with the terminal apparatus TDb is established, unless the WFD connection operation is performed once again by the MFP 10, the MFP 10 is not able to establish the WFD connection with the target terminal apparatus TDa. In the present embodiment, because the character string "DIRECT-" is not described in the capability information description area 56 of the Probe Req. signal, the MFP 10 determines that the WFD connection should not be established with the terminal apparatus TDb (T22), and does not send the Probe Res. signal to the terminal apparatus TDb. Therefore, the MFP 10 does not establish any WFD connection with the terminal apparatus TDb. Thus, the MFP 10 can suppress the establishment of the WFD connection with the terminal apparatus TDb, which differs from the target terminal apparatus TDa, and consequently can appropriately establish the WFD connection with the target terminal apparatus TDa. That is, in a case where the Probe Req. signal is received from the terminal apparatus TDa (T24), because the WPS information and the character string "DIRECT-" are respectively described in the WPS information description area 54 and the capability information description area 56 of the Probe Req. signal, the MFP 10 determines that the WFD connection is to be established with the terminal apparatus TDa (T26), and sends the terminal apparatus TDa the Probe Res. signal (T28). This makes it possible for the MFP 10 to appropriately establish the WFD connection with the target terminal apparatus TDa (T30).

(Correspondence Relationship)

The MFP 10 is an example of a "communication apparatus". The terminal apparatuses TDa and TDb are examples of "particular external apparatuses". The G/O device and the CL device are examples of a "parent station" and a "child station", respectively. The WFD connection and the WFD connection operation are examples of a "wireless connection" and a "wireless connection operation", respectively. The Probe Req. signals of T20 and T24, and the Probe Res. signal of T28 in FIG. 3 are examples of a "connection request signal" and a "response signal", respectively. The WPS scheme is an example of a "predetermined wireless connection scheme". The capability information description area 56 is an example of a "particular area". The SSID "DIRECT-AAA" and the character string "DIRECT-" are examples of a "parental identifier" and a "relation character string", respectively. The describing of the WPS information in the WPS information description area 54, and the describing of the character string "DIRECT-" in the capability information description area 56 are examples of a "first condition" and a "second condition", respectively.

The processing of S10 of FIG. 2 is an example of "receiving" and "determining". The processing of S12 and the processing of S14 are examples of "sending" and "establishing", respectively.

Second Embodiment

The present embodiment differs from the first embodiment in that a WFD connection is established with a particular terminal apparatus in a case where a Provision Discovery Req. signal that satisfies a predetermined condition is received from the particular terminal apparatus after a WFD connection operation has been performed by the MFP 10. Furthermore, in the present embodiment, it is assumed that a WFD connection is to be established between the MFP 10 and the terminal apparatus TDc in which the third communication program is installed.

Figure 4:
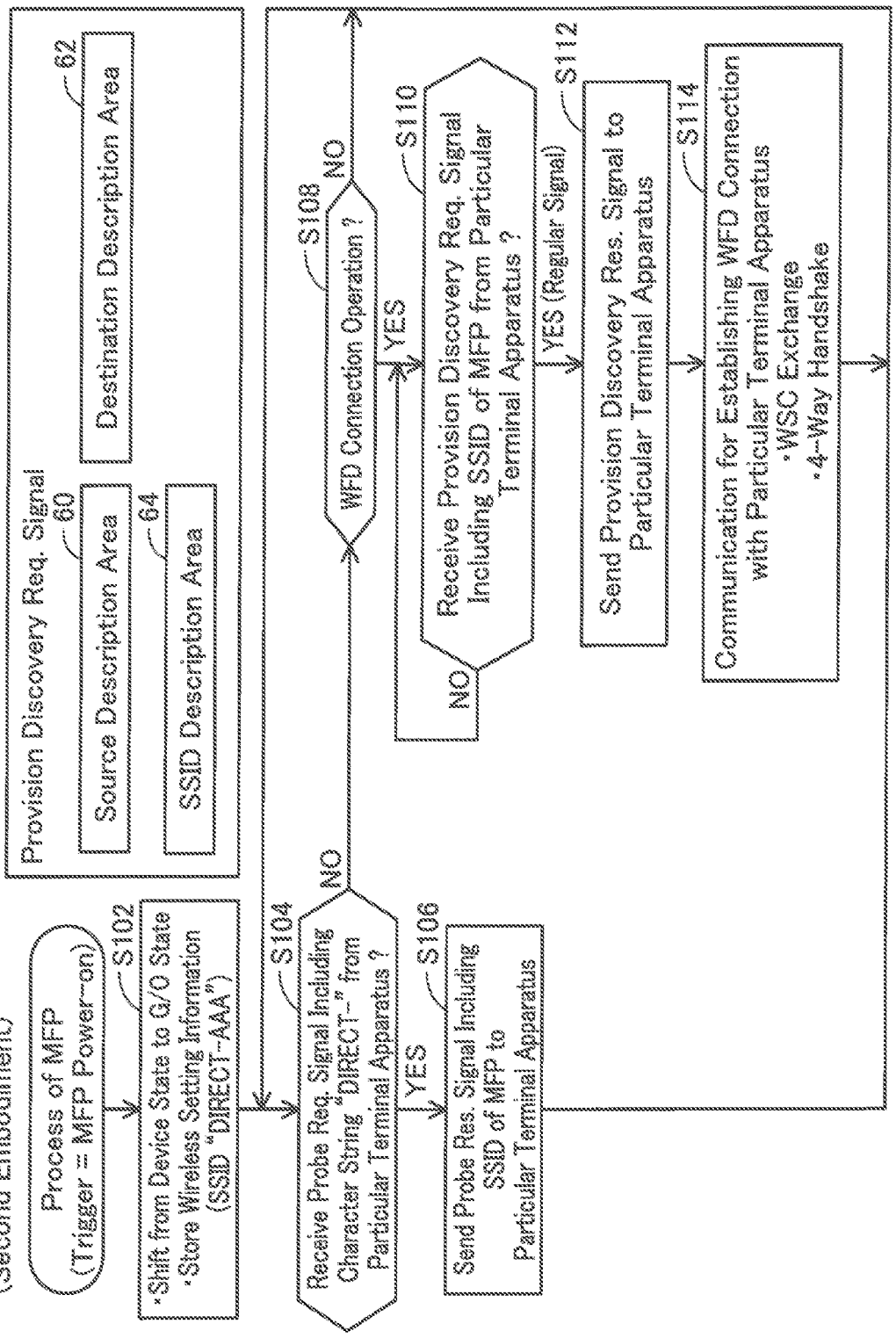
FIG. 4 shows a flowchart of processing in a multi-function apparatus of a second embodiment.

(Processing Performed by MFP; FIG. 4)

The contents of processing executed by the CPU 32 of the MFP 10 of the present embodiment will be explained by referring to FIG. 4. The processing of S102 to S108 is the same as the processing of S2 to S8 of FIG. 2. In S110, the CPU 32 monitors for a Provision Discovery Req. signal satisfying a predetermined condition to be received from the particular terminal apparatus.

The Provision Discovery Req. signal comprises a source description area 60, a destination description area 62, and an SSID description area 64. The source description area 60 is where the MAC address of the particular terminal apparatus, which is the source of the Provision Discovery Req. signal, is described. The destination description area 62 is where the MAC address of the MFP 10, which is the destination of the Provision Discovery Req. signal, is described. The SSID description area 64 is where an SSID (e.g., SSID "DIRECT-AAA" of the MFP 10) for identifying the WFDNW in which the particular terminal apparatus that is the source of the Provision Discovery Req. signal is to participate is described.

The Provision Discovery Req. signal differs from the Probe Req. signal, and does not comprise a WPS information description area. However, the Provision Discovery Req. signal is sent from a WFD device that supports the WFD scheme, and the WFD scheme is a wireless connection scheme that uses the WPS scheme. Therefore, the Provision Discovery Req. signal is sent from a device that supports the WPS scheme, and consequently, the Provision Discovery Req. signal itself is considered to be WPS information that supports the WPS scheme.

In S110, the CPU 32 determines that the Provision Discovery Req. signal is a regular signal (YES in S110) in a case where a Provision Discovery Req. signal in which the SSID "DIRECT-AAA" of the MFP 10 is described in the SSID description area 64 is received from the particular terminal apparatus. In this case, in S112, the CPU 32 sends the particular terminal apparatus a Provision Discovery Res. signal. Alternatively, in a case where either a Provision Discovery Req. signal or a Probe Req. signal in which an SSID that differs from the SSID "DIRECT-AAA" of the MFP 10 is described in the SSID description area 64 is received, the CPU 32 determines that the signal is a non-regular signal (NO in S110), and does not proceed to S112 (i.e., does not send the Provision Discovery Res. signal).

S114 is the same as S14 of FIG. 2, and the wireless setting information (i.e., the SSID "DIRECT-AAA", the authentication scheme, the encryption scheme, and the password) created in S2 are sent to the particular terminal apparatus. However, unlike S14 of FIG. 2, the CPU 32 does not perform a Provision Discovery Req./Res. signal communication with the particular terminal apparatus. When S114 ends, the CPU 32 returns to S104.

Figure 5:
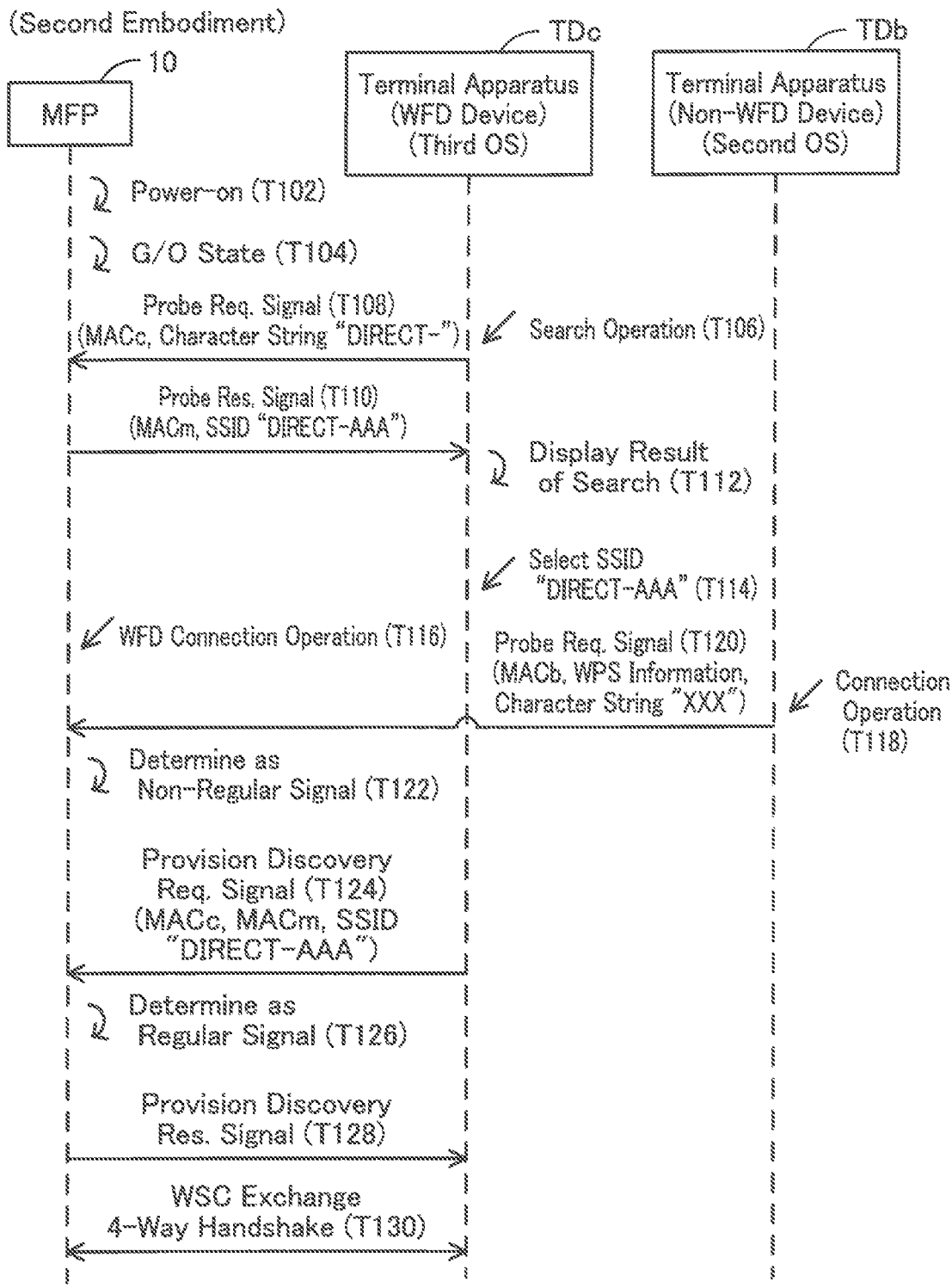
FIG. 5 shows a sequence diagram of the second embodiment.

(Specific Case: FIG. 5)

Next, the contents of a specific case realized according to the flowchart of FIG. 4 will be explained by referring to FIG. 5. The MFP 10 user wants to establish a WFD connection between the MFP 10 and the terminal apparatus TDc.

T102 to T122 are the same as T2 to T22 of FIG. 3. The third communication program is installed on the terminal apparatus TDc. In the third communication program differs from the first communication program, and in T114, a Provision Discovery Req. signal is sent instead of a Probe Req. signal (refer to T24 of FIG. 3) after the SSID "DIRECT-AAA" of the MFP 10 has been selected. Therefore, in T124, the terminal apparatus TDc sends the MFP 10 a Provision Discovery Req. signal. The respective areas 60 to 64 of Provision Discovery Req. signal of T124 are in the following states. The MAC address of the terminal apparatus TDc (i.e., MACc) is described in the source description area 60. The MACm is described in the destination description area 62. The SSID "DIRECT-AAA" of the MFP 10 is described in the SSID description area 64.

Upon receiving the Provision Discovery Req. signal from the terminal apparatus TDc, the MFP 10 determines in T126 that the Provision Discovery Req. signal is a regular signal (i.e., a WFD connection is to be established with the terminal apparatus TDc) (YES in S110 of FIG. 4). This is because the SSID "DIRECT-AAA" is described in the SSID description area 64 of the Provision Discovery Req. signal. Then, the MFP 10 sends the terminal apparatus TDc a Provision Discovery Res. signal in T128 (S112), and performs WSC Exchange and 4-Way Handshake communications with the particular terminal apparatus in T130 (S114). Hereby, the CPU 32 can establish a WFD connection with the terminal apparatus TDc, and cause the terminal apparatus TDc to participate as a CL device in the WFDNW in which the MFP10 operates as the G/O device.

Effects of Second Embodiment

The present embodiment achieves the same effects as the first embodiment. That is, as shown in FIG. 5, when receiving the Probe Req. signal from the terminal apparatus TDb, which differs from the target terminal apparatus TDc (T120), the MFP 10 does not send any Probe Res. signal to the terminal apparatus TDb (T122), and does not establish a WFD connection with the terminal apparatus TDb. Therefore, in the case where the Provision Discovery Req. signal is received from the target terminal apparatus TDc (T124), the MFP 10 can appropriately establish the WFD connection with the target terminal apparatus TDc (T130).

(Correspondence Relationship)

The terminal apparatuses TDb and TDc are examples of a "particular external apparatus". The Provision Discovery Req. signal of T124 of FIG. 5 is an example of a "connection request signal". The SSID description area 64 is an example of a "particular area". The SSID "DIRECT-AAA" is an example of a "relation character string". The fact that a received signal is a Provision Discovery Req. signal, and that SSID "DIRECT-AAA" is described in the SSID description area 64 are examples of a "first condition" and a "second condition", respectively. The processing of S110 of FIG. 4 is an example of "receiving" and "determining". The processing of S112 and the processing of S114 are examples of "sending" and "establishing", respectively.

Third Embodiment

The present embodiment differs from the first embodiment in that the MFP 10 does not shift to the G/O state when the power to the MFP 10 is turned ON. Furthermore, in the present embodiment, the MFP 10 can establish a WFD connection with the terminal apparatus TDa, which is a WFD device installed with the first communication program, the same as in the first embodiment, but in addition can also establish a WFD connection with the terminal apparatus TDd, which is a non-WFD device (a so-called legacy device) installed with the fourth communication program.

Figure 6:
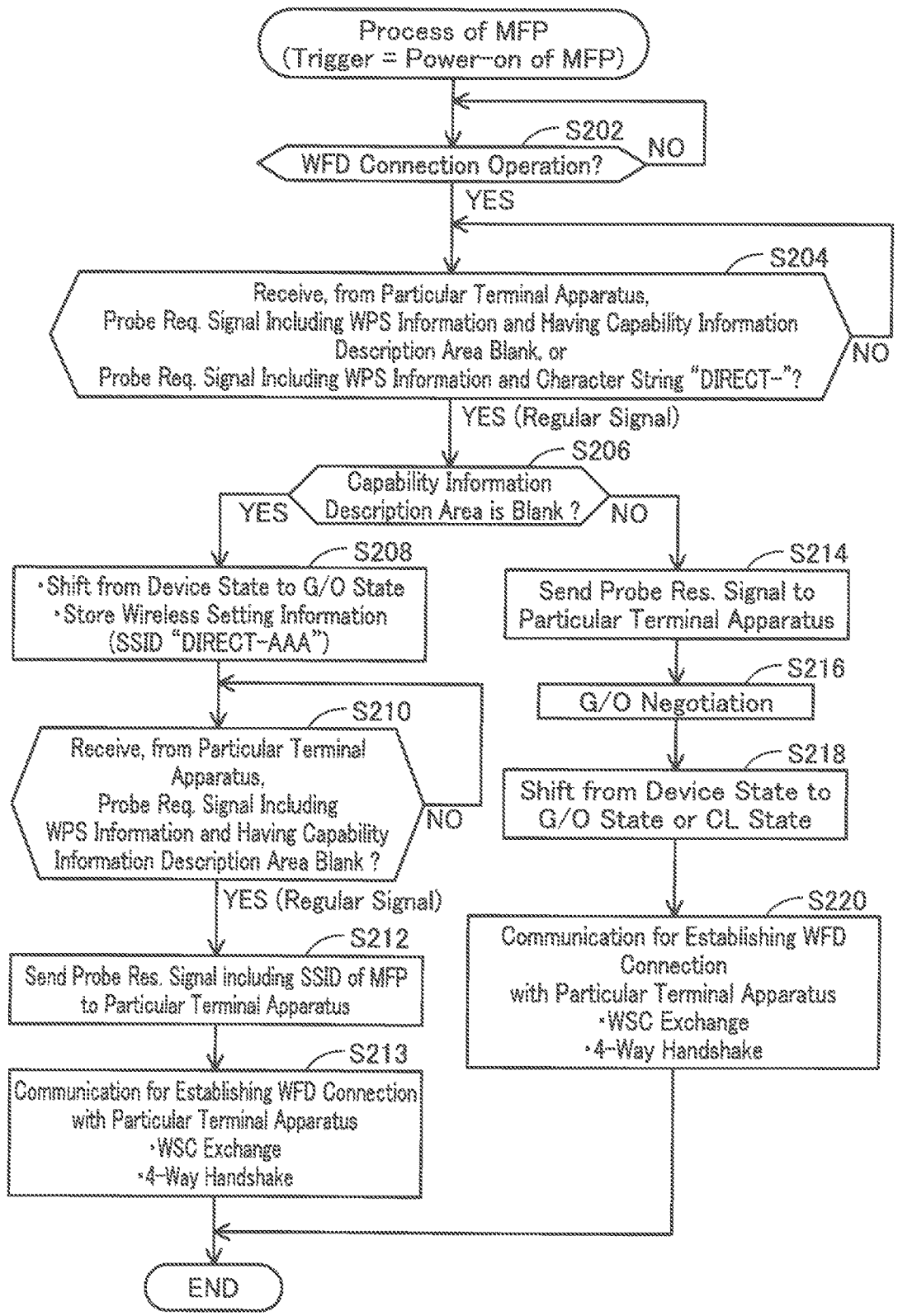
FIG. 6 shows a flowchart of processing in a multi-function apparatus of a third embodiment.

(Processing Performed by MFP: FIG. 6)

The contents of processing executed by the CPU 32 of the MFP 10 of the present embodiment will be explained by referring to FIG. 6. The processing of FIG. 6 is triggered by the power to the MFP being turned ON by the MFP 10 user. Even after the power to the MFP 10 has been turned ON, the operating state of the MFP 10 is maintained in the Device state of the WFD scheme without shifting to the G/O state.

In S202, the CPU 32 monitors for a WFD connection operation (i.e., a push-button operation of a PBC scheme) to be performed by the user on the operation unit 12 of the MFP 10. In a case where the WFD connection operation is performed (YES in S202), the CPU 32 proceeds to S204.

In S204, the CPU 32 monitors for either a first type or a second type of regular signal to be received from the particular terminal apparatus. A first type of regular signal is a Probe Req. signal in which WPS information is described in the WPS information description area 54, and the capability information description area 56 is left blank. A second type of regular signal is a Probe Req. signal in which WPS information and the character string "DIRECT-" are described in the WPS information description area 54 and the capability information description area 56, respectively. The CPU 32 proceeds to S206 in a case where either the first type or the second type of regular signal from the particular terminal apparatus is received (YES in S204). Alternatively, in a case where either a Probe Req. signal in which WPS information is not described in the WPS information description area 54, or a Probe Req. signal in which a character string other than the character string "DIRECT-" is described in the capability information description area 56 is received, the CPU 32 determines NO in S204, and does not proceeds to S206. That is, the CPU 32 determines that the Probe Req. signal is a non-regular signal, and does not send a Probe Res. signal to the particular terminal apparatus.

In S206, the CPU 32 determines whether or not a character string is described in the capability information description area 56 of the Probe Req. signal received in S204. The CPU 32 proceeds to S208 in a case where the capability information description area 56 of the Probe Req. signal is blank (i.e., in a case where the Probe Req. signal is a first type of regular signal) (YES in S206), that is, in a case where the particular terminal apparatus does not support the WFD scheme. Furthermore, the CPU 32 proceeds to S214 in a case where the character string "DIRECT-" is described in the capability information description area 56 of the Probe Req. signal (i.e., in a case where the Probe Req. signal is a second type of regular signal) (NO in S206), that is, in a case where the particular terminal apparatus supports the WFD scheme.

In S208, the CPU 32 shifts the operating state of the MFP 10 from the Device state to the G/O state without performing a G/O negotiation. S208 is the same as S2 of FIG. 2.

In S210, the CPU 32 monitors for a first type of regular signal to be received from the particular terminal apparatus. The CPU 32 proceeds to S212 in a case where a first type of regular signal is received from the particular terminal apparatus (YES in S210). Alternatively, the CPU 32 determines NO in S210 and does not proceed to S212 in a case where either a Probe Req. signal in which WPS information is not described in the WPS information description area 54, or a Probe Req. signal in which some kind of character string is described in the capability information description area 56 is received. That is, the CPU 32 determines that the Probe Req. signal is a non-regular signal, and does not send a Probe Res. signal to the particular terminal apparatus.

In S212, the CPU 32 sends the particular terminal apparatus a Probe Res. signal including the MAC address of the MFP 10 and the SSID "DIRECT-AAA" created in S208.

In S213, the CPU 32 performs various signal (i.e., WSC Exchange, 4-Way Handshake) communications with the particular terminal apparatus for establishing a WFD connection, and establishes a WFD connection with the particular terminal apparatus. In S213, Provision Discovery Req./Res. signal communications are not performed. This is because the particular terminal apparatus does not support the WFD scheme. The processing of FIG. 6 ends when S213 ends.

Alternatively, in S214, the CPU 32 sends the particular terminal apparatus a Probe Res. signal including the MAC address of the MFP 10. This Probe Res. signal does not include the SSID. This is because at this stage operating state of the MFP 10 is the Device state, and the SSID of the MFP 10 has not been created.

In S216, the CPU 32 performs a G/O negotiation with the particular terminal apparatus. In the G/O negotiation, the CPU 32 sends the particular terminal apparatus information (more specifically, an Intent value) indicating the G/O priority of the MFP 10, and receives from the particular terminal apparatus information indicating the G/O priority of the particular terminal apparatus. The G/O priority of the MFP 10 is an index indicating the extent to which the MFP 10 should be in the G/O state, and is determined beforehand in the MFP 10. In the same manner, the G/O priority of the particular terminal apparatus is an index indicating the extent to which the particular terminal apparatus should be in the G/O state, and is determined beforehand in the particular terminal apparatus. The CPU 32 compares the G/O priority of the MFP 10 to the G/O priority of the particular terminal apparatus, determines that the apparatus with the highest priority to be in the G/O state, and determines the apparatus with the lowest priority to be in the CL state.

In S218, the CPU 32 shifts the operating state of the MFP 10 from the Device state to either the G/O state or the CL state in accordance with the result of the G/O negotiation of S216. In a case where the MFP 10 shifts to the G/O state, the CPU 32 causes the memory 34 to store the wireless setting information (i.e., the SSID "DIRECT-AAA" of the MFP 10) in the same manner as in S208. Alternatively, in a case where the MFP 10 shifts to the CL state, the CPU 32 does not cause the memory 34 to store the wireless setting information. In this case, the WFDNW is created by the particular terminal apparatus, which is the G/O device, and as such, the wireless setting information is prepared by the particular terminal apparatus.

S220 is the same as S213. In S220, a Provision Discovery Req./Res. signal communication is not performed. This is because the Provision Discovery Req./Res. signal communication is not necessary in a case where a WFD connection is to be established via a G/O negotiation. In a case where the MFP 10 is the G/O device, the CPU 32 sends the particular terminal apparatus the wireless setting information created in S218, and establishes a WFD connection with the particular terminal apparatus. Hereby, the CPU 32 can cause the particular terminal apparatus to participate as the CL device in the WFDNW in which the MFP 10 is the G/O device. Alternatively, in a case where the MFP 10 is the CL device, the CPU 32 receives the wireless setting information from the particular terminal apparatus, and establishes a WFD connection with the particular terminal apparatus. Hereby, the CPU 32 can cause the MFP 10 to participate as the CL device in the WFDNW in which the particular terminal apparatus is the G/O device. The processing of FIG. 6 ends when S220 ends.

Although omitted from the drawing, in the processing of FIG. 6, prior to S202, the CPU 32 executes the same processing as that of S4 and S6 of FIG. 2. However, because the MFP 10 is in the Device state, the Probe Res. signal of S6 includes the MFP 10 device name in place of the SSID "DIRECT-AAA" of the MFP 10. In the processing of FIG. 6, when determining YES in S4, the CPU 32 proceeds to S6 and subsequently returns to S4. Alternatively, when determining NO in S4, the CPU 32 proceeds to S202.

(Specific Case; FIG. 7)

Next, the contents of a specific case realized according to the flowchart of FIG. 6 will be explained by referring to FIG. 7. In Case A of FIG. 7, the user of the MFP 10 wants to establish a WFD connection between the MFP 10 and the terminal apparatus TDd, which is a non-WFD device. After the power has been turned ON, the MFP 10 maintains the Device state. In T204, the user performs a WFD connection operation on the MFP 10 (YES in S202).

T206 and T208 are the same as T18 and T20 of FIG. 3, respectively. Upon receiving a Probe Req. signal from the terminal apparatus TDd, the MFP 10 determines in T210 that the Probe Req. signal is a non-regular signal (NO in S204 of FIG. 6).

In T212, the user performs a WPS connection operation on the terminal apparatus TDd. The WPS connection operation is not for selecting the SSID of the MFP 10 from among the results of search displayed on the terminal apparatus TDd (refer to T14 of FIG. 3). The WPS connection operation is for establishing a WFD connection with a Device state WFD device (i.e., the MFP 10) that exists peripherally to the terminal apparatus TDd, and corresponds to a push-button operation of the PBC scheme. In T214, the terminal apparatus TDd sends a Probe Req. signal. The respective areas 50 to 56 of the Probe Req. signal (refer to FIG. 2) are in the following states. The MAC address (called "MACd" hereinbelow) of the terminal apparatus TDd is described in the source description area 50. Since the terminal apparatus TDd does not acquire the MACm, the destination description area 52 is in the null state. The aforementioned fourth communication program is installed in the terminal apparatus TDd, and in the fourth communication program, in a case where the destination description area 52 is in the null state, the WPS information is described in the WPS information description area 54. Furthermore, since the terminal apparatus TDd is a non-WFD device, the capability information description area 56 is left blank.

Upon receiving the Probe Req. signal from the terminal apparatus TDd, the MFP 10 determines in T216 that the Probe Req. signal is a first type of regular signal (YES in S204 and S206 of FIG. 6). In accordance with receiving a first type of regular signal from the terminal apparatus TDd, the MFP 10 can determine that the terminal apparatus TDd is a non-WFD device, and consequently can determine that the terminal apparatus TDd will not be able to perform a G/O negotiation. Therefore, in T218, the MFP 10 spontaneously shifts from the Device state to the G/O state without performing a G/O negotiation (S208). In accordance with this, a WFDNW is formed to which only the MFP 10, which is the G/O device, belongs.

T220 is the same as T214. Upon receiving the Probe Req. signal from the terminal apparatus TDd, the MFP 10 determines in T222 that the Probe Req. signal is a first type of regular signal (YES in S210 of FIG. 6). T224 and T226, respectively, are the same as T28 of FIG. 3 and T130 of FIG. 5. Hereby, the MFP 10 can establish a WFD connection with the terminal apparatus TDd, and can cause the terminal apparatus TDd to participate in the WFDNW in which the MFP 10 operates as the G/O device. Since the terminal apparatus TDd is a non-WFD device, it does not participate in the WFDNW as a CL device. However, the MFP 10 causes the terminal apparatus TDd to participate in the WFDNW by treating the terminal apparatus TDd in the same manner as a CL device.

(Case B; FIG. 8)

In FIG. 8, the MFP 10 user wants to establish a WFD connection between the MFP 10 and the terminal apparatus TDa, which is a WFD device. T306 and T308, respectively, are the same as T6 and T8 of FIG. 3. Because the MFP 10 is in the Device state, upon receiving a Probe Req. signal from the terminal apparatus TDa, the MFP 10 sends the terminal apparatus TDa a Probe Res. signal including the MACm and the MFP 10 device name in T310.

Upon receiving the Probe Res. signal from the MFP 10, the terminal apparatus TDa causes the display unit (not shown) of the terminal apparatus TDa to display results of search including the MFP 10 device name in T312. In T314, the user selects an MFP 10 device name from among the results of search. MFP 10 device name selection operation here is for establishing a WFD connection between the MFP 10 and the terminal apparatus TDa, and corresponds to a push-button operation of the PBC scheme. T318 to T322 are the same as T18 to T22 of FIG. 3.

In T324, the terminal apparatus TDa sends a Probe Req. signal. The respective areas 50 to 56 (refer to FIG. 2) of this Probe Req. signal are the following states. That is, the MACa is described in the source description area 50. Since the terminal apparatus TDa does not acquire the MACm, the destination description area 52 is in the null state. Since the terminal apparatus TDa supports the WPS scheme, the WPS information is described in the WPS information description area 54. Since the terminal apparatus TDa supports the WFD scheme, the character string "DIRECT-" is described in the capability information description area 56.

Upon receiving the Probe Req. signal from the terminal apparatus TDa, the MFP 10 determines in T326 that this Probe Req. signal is a second type of regular signal (YES in S204 of FIG. 6, NO in S206 of FIG. 6). The MFP 10 can determine that the terminal apparatus TDb is a WFD device in accordance with receiving the second type of regular signal from the terminal apparatus TDa, and consequently can determine that the terminal apparatus TDa is capable of performing a G/O negotiation. Therefore, in T328, the MFP 10 sends the terminal apparatus TDa a Probe Res. signal including the MACm (S214), and in T330, performs a G/O negotiation with the terminal apparatus TDa (S216). As a result, in T332, the MFP 10 causes the operating state of the MFP 10 to shift from the Device state to the G/O state (S218). In T334, the terminal apparatus TDa causes the operating state of the terminal apparatus TDa to shift from the Device state to the CL state. In T336, the MFP 10 performs WSC Exchange and 4-Way Handshake communications with the terminal apparatus TDa (S220). Hereby, the MFP 10 can establish a WFD connection with the terminal apparatus TDa, and can cause the terminal apparatus TDa to participate as the CL device in the WFDNW in which the MFP 10 operates as the G/O device.

Furthermore, the MFP 10 can establish a WFD connection with another terminal apparatus that differs from the terminal apparatus TDa by repeating the following processing after having established the WFD connection with the terminal apparatus TDa in T336. Specifically, the MFP 10 and the other terminal apparatus perform T306 to T310. However, in T310, because the MFP 10 is already the G/O state, the Probe Res. signal includes the SSID "DIRECT-AAA" of the MFP 10 in place of the MFP 10 device name. Then, the MFP 10 performs the same processing as T12, T14, and T24 to T30 of FIG. 3.

Effects of Third Embodiment

The present embodiment achieves the same effects as the first embodiment. That is, as shown in FIG. 7, even when receiving the Probe Req. signal from the terminal apparatus TDb, which differs from the target terminal apparatus TDd (T208), the MFP 10 does not send any Probe Res. signal to the terminal apparatus TDb (T210), and does not establish a WFD connection with the terminal apparatus TDb. Therefore, in a case where the Probe Req. signal is received from the target terminal apparatus TDd (T214, T220), the MFP 10 can appropriately establish the WFD connection with the target terminal apparatus TDd (T226). Furthermore, as shown in FIG. 8, in a case where the Probe Req. signal is received from the target terminal apparatus TDa (T324), the MFP 10 can appropriately establish the WFD connection with the target terminal apparatus TDa (T336). In addition, in the present embodiment, the MFP 10 can appropriately switch the processing for establishing the WFD connection depending on whether the target terminal apparatus is the WFD device (i.e., terminal apparatus TDa) or the non-WFD device (i.e., terminal apparatus TDd) (S208 to S213 or S214 to S220 of FIG. 6).

(Correspondence Relationship)

Terminal apparatuses TDa, TDb, and TDd are examples of a "particular external apparatus". The G/O negotiation is an example of a "predetermined wireless communication". The fact that the WPS information is described in the WPS information description area 54 is an example of a "first condition". The fact that either the capability information description area 56 is left blank, or the character string "DIRECT-" is described in the capability information description area 56 is an example of a "second condition". The processing of S204 of FIG. 6 is an example of "receiving". The processing of S204 and S210 are examples of "determining". The processing of S212 and S214 are examples of "sending". The processing of S213 and S220 are examples of "establishing". The processing of S208 is an example of "status shifting". The processing of S216 is an example of "deciding".

(Modification 1) In the embodiments described hereinabove, the "predetermined wireless scheme" is the WPS scheme, but may be another automatic wireless setting scheme (e.g., AOSS (abbreviation of AirStation One-Touch Secure System)).

(Modification 2) In the embodiments described hereinabove, the "communication apparatus" is not limited to a multi-function apparatus (i.e., the MFP 10) that is capable of performing a print function and a scan function, and may be a printer that is only able to perform the print function from among the print function and the scan function, or may be a scanner that is only able to perform the scan function from among the print function and the scan function. Furthermore, the "communication apparatus" may be an apparatus (e.g., a PC, a server, or a portable terminal (mobile phone, smartphone, PDA, or the like)) that performs a function (e.g., image display function, data processing function) that differs from the print function and the scan function. That is, the "communication apparatus" includes all sorts of devices that are capable of establishing a wireless connection in accordance with a predetermined wireless connection scheme. Furthermore, the "particular external apparatus" is not limited to the terminal apparatuses TDa to TDd, and includes all sorts of devices that are capable of establishing a wireless connection.

(Modification 3) In the embodiments described hereinabove, the respective processing of FIG. 2, FIG. 4, and FIG. 6 is realized in accordance with the CPU 32 of the MFP 10 executing a program (i.e., software). Instead of this, at least one of the processes of the respective processes of FIG. 2, FIG. 4 and FIG. 6 may be realized using a logical circuit or other such hardware.

What is claimed is:

1. A communication apparatus comprising:
   a processor;
   a communication interface configured to send and receive data; and
   a memory operatively coupled to the processor and storing computer-readable instructions therein, the computer-readable instructions, when executed by the processor, causing the communication apparatus to perform:
   receiving, via the communication interface, a connection request signal from a particular external apparatus after a wireless connection operation for establishing a wireless connection with an external apparatus has been performed on the communication apparatus;
   determining, based on the connection request signal in a case where the connection request signal is received from the particular external apparatus, whether a wireless connection with the particular external apparatus is to be established;
   sending, via the communication interface, a response signal for establishing the wireless connection with the particular external apparatus to the particular external apparatus in a case of determining that the wireless connection with the particular external apparatus is to be established, wherein the response signal is not sent to the particular external apparatus in a case of determining that the wireless connection with the particular external apparatus is not to be established; and
   establishing the wireless connection with the particular external apparatus according to a predetermined wireless connection scheme in a case where the response signal is sent to the particular external apparatus, the predetermined wireless connection scheme being for establishing the wireless connection between the communication apparatus and the particular external apparatus without an input of an identifier for authentication by a user to any of the communication apparatus and the particular external apparatus,
   wherein the determining includes:
   determining that the wireless connection with the particular external apparatus is to be established in a case where both a first condition and a second condition are satisfied, the first condition being a condition that the connection request signal is a request according to the predetermined wireless connection scheme, the second condition being a condition that a state of a particular area in the connection request signal is a predetermined state, the particular area being an area in which a relation character string is to be described, and the relation character string being related to an identifier used in the wireless connection which is to be established between the communication apparatus and the particular external apparatus; and
   determining that the wireless connection with the particular external apparatus is not to be established in a case where at least one of the first condition and the second condition is not satisfied.

2. The communication apparatus as in claim 1, wherein the wireless connection to be established between the communication apparatus and the particular external apparatus is a wireless connection in which one of the communication apparatus and the particular external apparatus operates as a parent station and the other operates as a child station, and
   the predetermined state includes a state in which the relation character string including a partial character string is described in the particular area, the partial character string being a part of a parent identifier for identifying the parent station.

3. The communication apparatus as in claim 2, wherein the determining further includes determining that the second condition is satisfied in a case where the relation character string including only the partial character string is described in the particular area.

4. The communication apparatus as in claim 2, wherein the receiving includes receiving, via the communication interface, the connection request signal from the particular external apparatus in a state in which the communication apparatus is not operating as either the parent station or the child station, and
   the computer-readable instructions cause the communication apparatus to further perform:
   deciding whether the communication apparatus is to operate as the parent station or the child station by executing a predetermined wireless communication with the particular external apparatus for deciding whether the communication apparatus is to operate as the parent station or the child station, after the response signal has been sent to the particular external apparatus.

5. The communication apparatus as in claim 2, wherein the receiving includes receiving, via the communication interface, the connection request signal from the particular external apparatus in a state in which the communication apparatus operates as the parent station, and
   the determining further includes determining that the second condition is satisfied in a case where the relation character string including an entirety of the parent identifier for identifying the communication apparatus operating as the parent station is described in the particular area.

6. The communication apparatus as in claim 1, wherein the predetermined state includes a state in which the relation character string is not described in the particular area.

7. The communication apparatus as in claim 6, wherein:
the wireless connection to be established between the communication apparatus and the particular external apparatus is a wireless connection in which one of the communication apparatus and the particular external apparatus operates as a parent station and the other operates as a child station,
the receiving includes receiving, via the communication interface, the connection request signal from the particular external apparatus in a state in which the communication apparatus is not operating as either the parent station or the child station, and
the computer-readable instructions cause the communication apparatus to further perform:
shifting a state of the communication apparatus from a state in which the communication apparatus is not operating as either the parent station or the child station to a state in which the communication apparatus operates as the parent station, and
the sending includes sending, via the communication interface, the response signal to the particular external apparatus after the state of the communication apparatus has been shifted to the state in which the communication apparatus operates as the parent station.

8. A non-transitory computer-readable storage medium storing computer-readable instructions for a communication apparatus,
wherein the computer-readable instructions, when executed by a processor operatively connected to a memory of the communication apparatus, cause the communication apparatus to perform:
receiving, via a communication interface of the communication apparatus, a connection request signal from a particular external apparatus after a wireless connection operation for establishing a wireless connection with an external apparatus has been performed on the communication apparatus;
determining based on the connection request signal in a case where the connection request signal is received from the particular external apparatus, whether a wireless connection with the particular external apparatus is to be established;
sending, via the communication interface, a response signal for establishing the wireless connection with the particular external apparatus to the particular external apparatus in a case of determining that the wireless connection with the particular external apparatus is to be established,
wherein the response signal is not sent to the particular external apparatus in a case of determining that the wireless connection with the particular external apparatus is not to be established; and
establishing the wireless connection with the particular external apparatus according to a predetermined wireless connection scheme in a case where the response signal is sent to the particular external apparatus, the predetermined wireless connection scheme being for establishing the wireless connection between the communication apparatus and the particular external apparatus without an input of an identifier for authentication by a user to any of the communication apparatus and the particular external apparatus,
wherein the determining includes:
determining that the wireless connection with the particular external apparatus is to be established in a case where both a first condition and a second condition are satisfied, the first condition being a condition that the connection request signal is a request according to the predetermined wireless connection scheme, the second condition being a condition that a state of a particular area in the connection request signal is a predetermined state, the particular area being an area in which a relation character string is to be described, and the relation character string being related to an identifier used in the wireless connection which is to be established between the communication apparatus and the particular external apparatus; and
determining that the wireless connection with the particular external apparatus is not to be established in a case where at least one of the first condition and the second condition is not satisfied.

* * * * *